United States Patent [19]

Orain

[11] Patent Number: 5,031,303
[45] Date of Patent: Jul. 16, 1991

[54] METHODS AND DEVICE FOR ACCURATELY POSITIONING A ROLLER SEGMENT FOR THE PURPOSE OF FINISHING ITS PIVOTING BEARING SURFACE, AND A METHOD FOR MACHINING THE SEATS OF DEVICE OF THIS KIND

[75] Inventor: Michel Orain, Conflans-Ste-Honorine, France

[73] Assignee: Glaenzer Spicer, Poissy, France

[21] Appl. No.: 430,603

[22] Filed: Nov. 2, 1989

[30] Foreign Application Priority Data

Nov. 18, 1988 [FR] France .................. 88 15007

[51] Int. Cl.$^5$ .............................................. B23Q 7/00
[52] U.S. Cl. .................................. 29/559; 51/217 T; 51/291; 269/156; 269/268
[58] Field of Search ........ 29/559; 51/216 LR, 217 R, 51/217 T, 217 L, 291; 269/156, 268

[56] References Cited

U.S. PATENT DOCUMENTS

| 1,436,626 | 11/1922 | Spaander . | |
|---|---|---|---|
| 2,304,984 | 12/1942 | Wood | 51/217 L |
| 2,545,447 | 3/1951 | Clement | 51/217 L X |
| 2,722,115 | 11/1955 | Dunn . | |
| 3,030,739 | 4/1962 | Folley | 51/291 X |
| 3,079,736 | 3/1963 | Kratt | 51/217 L |
| 3,079,737 | 3/1963 | Kratt | 51/217 L |
| 3,153,960 | 10/1964 | Allport | 51/217 L X |
| 4,201,376 | 5/1980 | Philips | 269/156 |
| 4,288,946 | 9/1981 | Bicskel | 29/559 X |
| 4,512,750 | 4/1985 | Orain . | |
| 4,593,444 | 6/1986 | Kavthekar | 51/291 X |
| 4,657,168 | 4/1987 | Matlock | 269/156 X |

FOREIGN PATENT DOCUMENTS

| 239427 | 9/1987 | European Pat. Off. . |
|---|---|---|
| 1380557 | 10/1963 | France . |
| 2342130 | 9/1977 | France . |
| 2594505 | 8/1987 | France . |
| 57-6131 | 1/1982 | Japan . |
| 2199113 | 6/1988 | United Kingdom . |

OTHER PUBLICATIONS

The Tool and Manufacturing Engineer, vol. 53, No. 4, Oct. 1964, p. 58, Society of Manufacturing Engineers, Milwaukee, U.S.; "Fixture Aligns Castings for Machining-Disregards Shifted Cores".

Primary Examiner—Mark Rosenbaum
Assistant Examiner—Frances Chin
Attorney, Agent, or Firm—Wenderoth, Lind & Ponack

[57] ABSTRACT

A roller segment (14) is held for the purpose of machining a spherical internal bearing surface (10). Its toric external surfaces (18) is supported against two fixed seats (17), immobilized with respect to rotation about an axis (VV') passing through the centers (c) of the profiles of the fixed seats (17) by a third seat (19), which is radially movable. Claws (21) hold the segment against the seats and circumferentially position the segment about the axis (UU') of its toric surface (18).

The bearing surface (10) is ground with a slight eccentricity (e) relative to the toric surface, and by grinding a surface suitable for hydrodynamic lubrication is obtained.

8 Claims, 8 Drawing Sheets

METHODS AND DEVICE FOR ACCURATELY POSITIONING A ROLLER SEGMENT FOR THE PURPOSE OF FINISHING ITS PIVOTING BEARING SURFACE, AND A METHOD FOR MACHINING THE SEATS OF DEVICE OF THIS KIND

BACKGROUND OF THE INVENTION

The present invention relates to methods for holding in position, for the purpose of machining a concave pivoting bearing surface, a roller segment having an external rolling surface with a rounded transverse profile, said roller segment being intended in particular to form part of a motor vehicle transmission joint.

The present invention also relates to a device for holding a roller segment of this kind in position for the purpose of the machining.

The invention relates in particular, but not limitatively, to roller segments intended to form part of a transmission joint comprising three spherical trunnions forming a tripod at the end of one of two shafts connected together by the joint. Depending on the direction of the movement to be transmitted, each spherical trunnion bears, through a roller segment, against one or another of two respective longitudinal rolling tracks provided inside a bowl fixed to the other of the two shafts connected together by the joint. Six roller segments are thus interposed, each between one of the rolling tracks and the respective trunnion. Each roller segment has a concave spherical bearing surface pivoting on the spherical trunnion, and an external toric rolling surface which is able to roll on the rolling track and to be inclined laterally relative to the rolling track, which has a concave cylindrical profile. These sliding homokinetic joints possess the properties of comfort and compactness required for equipping modern motor vehicles. They are described in French Patent Application No. 86 17 044 of the 5th Dec. 1986 now GB 2199113.

The remarkable performance of these joints is to a a large extent due to the hydrodynamic lubrication of the spherical articulation between the spherical trunnion and the concave spherical bearing surface of the segment. This hydrodynamic lubrication practically cancels out the resultant slide drag, while accepting high pressures for the load transfer. The constitution of the extremely thin film of lubricant—taking into account the low speeds of sliding—entails perfect complementarity of the surfaces.

Methods are known for the machining of the concave pivoting bearing surface which enable only an approximate complementarity to be achieved. These methods therefore entail additional stages of grinding in of the two surfaces, one against the other, by a method used in the production of optical lenses. The need for such grinding in is incompatible with the imperatives of cost price and production rates of the motor vehicle industry.

In order that the machining of the pivoting bearing surface may attain the desired precision, it is necessary to hold the segment accurately in position during the machining.

The following technical requirements must in fact be complied with:

(a) Accurate achievement of the radial thickness dimension of the segment, which in large-scale series production permits assembly of joints with minimum clearance without risk of seizing;

(b) Accurate positioning of the axis and/or center of the pivoting bearing surface, which may be slightly eccentric relative to the center of the external rolling surface if it is desired to create the effect of a return of the segment to a neutral position in which the section bearing against the rolling track is situated at a circumferential mid-length of the segment. This effect is obtained if the radial thickness of the segment increases slightly from the section towards each end of the segment.

(c) Where necessary, correction of the concave bearing surface by the application to the segment appropriate forces during the machining so that the effective contact between the trunnion and the concave bearing surface under load will be as extensive as possible, despite the deformation of the segment through the action of the load. French Patent Application 87 13 976, unpublished, teaches that the behaviour of the segment under a real load can be simulated by applying, to the two ends of the segment, tangential compressive forces which are balanced by a force directed radially inwards and applied at circumferential mid-length of the external rolling bearing surface of the segment. Consequently, if the pivoting bearing surface is machined while the segment is thus artificially loaded, the bearing surface of the segment will be exactly complementary to the trunnion when the segment is subjected to its real nominal load.

The aim of the present invention is therefore to provide a method and a device for holding a roller segment in an accurate position appropriate for the machining of its concave pivoting bearing surface, despite the fact that the shape of the roller segment is complex and relatively unfavourable for such precision.

SUMMARY OF THE INVENTION

According to the invention the method for holding in position, for the purpose of machining a concave pivoting bearing surface, a roller segment, particularly for a motor vehicle transmission joint, having an external rolling surface with a rounded transverse profile, is characterized in that:

the external rolling surface is placed against two positioning seats fastened to one another and circumferentially spaced apart;

the segment is immobilized with respect to rotation about an axis substantially passing through the two positioning seats; and at each end of the segment a compressive force is applied which is oriented substantially tangentially in relation to the axis of the external rolling surface.

The axis and the center of the external rolling surface are thus precisely positioned relative to the positioning seats.

It is therefore possible to machine on the roller segment a pivoting bearing surface, such as a concave spherical bearing surface, whose center is situated on the axis of the external rolling surface and possible coincides with the center of the external rolling surface. For this to be the case it is sufficient for the machining tool to assume a position defined in relation to the positioning seats.

If, on the contrary, the center of the spherical bearing surface is desired to be eccentric in a predetermined radial direction relative to the axis of the external rolling surface, an angular positioning of the segment about the axis of its external rolling surface, relative to the positioning seats, is also effected. For preference, this angular positioning is achieved by acting on at least one end of the segment, which is caused to bear against a surface which is accurately positioned or guided relative to the positioning seats.

According to a second aspect of the invention, the method for holding in position, for the purpose of machining a concave pivoting bearing surface, a roller segment, particularly for a motor vehicle transmission joint, having an external rolling surface with a rounded transverse profile, is characterized in that:

the external rolling surface is placed against two positioning seats fastened to one another and circumferentially spaced apart;

at each end of the segment a compressive force is applied which is oriented substantially tangentially relative to the axis of the external rolling surface; and a force directed radially towards the interior of the external rolling surface is applied substantially at circumferential mid-length of the segment.

During machining the real load to which the segment will be subjected in operation is simulated, thus giving the pivoting bearing surface a geometry which will be perfect during the operation of the joint under load.

According to a third aspect of the invention, the device for holding in position, for the purpose of machining a concave pivoting bearing surface, a roller segment, particularly for a motor vehicle transmission joint, having an external rolling surface with a rounded transverse profile, characterized in that it comprises:

two positioning seats fastened to one another and intended to provide support for the external rolling surfaces, the seats being circumferentially spaced apart;

means for immobilizing the segment in relation to rotation about an axis substantially passing through the two positioning seats;

two claws, of which at least one is movable relative to the positioning seats, for applying to the two ends of the segment a compressive force directed substantially tangentially relative to the axis of the external rolling surface.

Preferably, the means for immobilizing the segment in relation to rotation about an axis substantially passing through the two positioning seats comprise a third seat, which is movable relative to the positioning seats, as well as means for urging the third seat to bear against the external rolling surface.

According to a fourth aspect of the invention, the method for machining the two positioning seats and the third seat which is urged towards the external rolling surface of the roller segment is characterized in that the third seat is wedged, against the urging force, in relation to the two positioning seats, and the three seats are machined together by the same rotation about an axis whose position, relative to the three seats, corresponds substantially to that which will subsequently be desired for the axis of the external rolling surface of the segments which are to be machined.

During the utilization of the device the wedging of the third seat is suppressed, so that said seat bears freely against the segments which are to be machined. Taking into account the conjoint machining of the three seats about an appropriate axis, the three seats accurately position the circumference of the segment in the plane desired for the machining of the pivoting bearing surface of the segments.

SUMMARY OF THE INVENTION

BRIEF DESCRIPTION OF THE DRAWINGS

Further features and advantages of the invention will emerge from the following description taken in conjunction with the accompanying drawings, given by way of non-limitative examples, wherein.

DETAILED DESCRIPTION OF THE PREFERRED EMBODIMENTS

Figures 1, 2, 3:
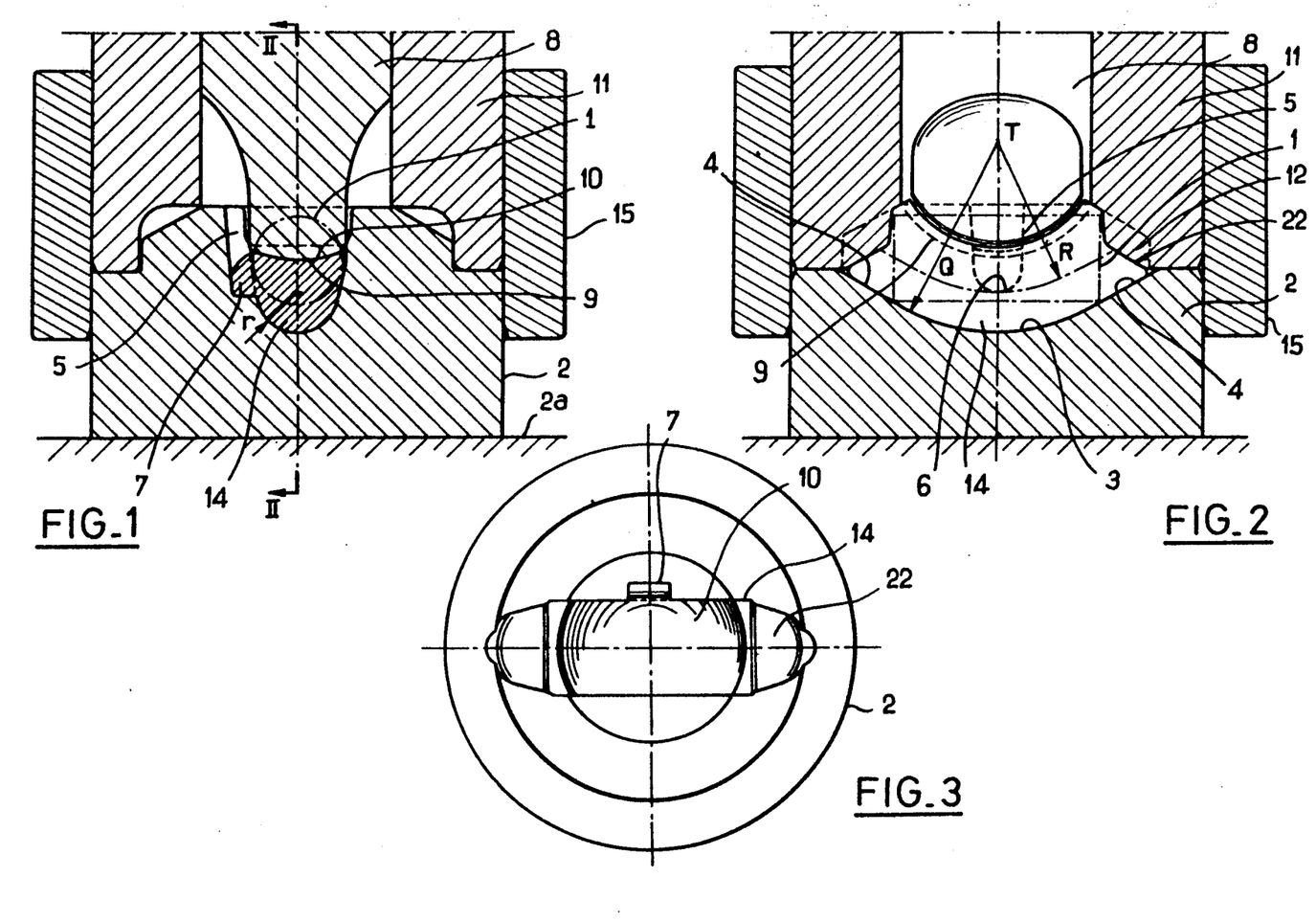
FIG. 1 is a view in cross-section of a roller segment blank in the course of shaping in a press, at the end of the stroke of the press stamp.
FIG. 2 is a view in section taken at plane II—II in FIG. 1.
FIG. 3 shows a finished blank resting in a bottom die, viewed from above.

As shown in FIGS. 1 and 2, the roller segment blank 14 is cold shaped from a cylindrical annealed steel billet 1 shown in dot-dash lines. This billet is introduced into a bottom die 2 fixed to the table 2a of a press. This bottom die carries an internal operative surface comprising a central torus segment 3 (FIG. 2) connected at its ends to two cylindrical surfaces 4 complementary to the rolling and sliding tracks which the interior surface of the bowl of the homokinetic joint, for which the segment 14 is provided, will have.

The segment 14 will therefore have an external surface comprising a central toric region extended at each end by a cylindrical region.

According to the unpublished French Patent Application 87 14 917, the two external cylindrical surfaces of the roller segment enable the latter to slide under relatively light pressure on the associated rolling and sliding track when the trunnion of the tripod associated with said segment is situated close to one or the other of its axial end positions relative to the bowl of the joint. This enables the joint to have a long sliding travel without the roller segment needing to have a corresponding circumferential travel around its tripod trunnion. On the contrary, when the tripod trunnion is situated substantially axially at mid-point inside the bowl, the roller segment functions by the rolling of its toric surface in the sliding and rolling track, which results in minimum friction for this situation, which corresponds to a very large proportion of the operating time of the joint.

The bottom die is provided with a lateral notch 5 whose cylindrical bottom 6 is complementary to a retaining button 7 to be formed laterally on the segment 14. According to French Patent Application 87 14 917, this button cooperates, during operation, with stops which, when the tripod approaches one of its axial end positions in the bowl, will if necessary cause the segment to pivot about its trunnion until the corresponding cylindrical region of the external surface of the segment is in contact with the rolling track. Any angular offset of the segment by sliding or rolling—accidental sliding of the toric region of the external surface of the segment—is thus automatically remedied.

The stamp 8 driven by the press piston (not shown) carries a spherical working end 9 substantially complementary to the concave spherical bearing surface 10 which is to be formed on the segment. The stamp 8 is guided inside a sleeve 11 carrying two angles 12 (FIG. 2) for forming the ends 22 of the segment 14.

The sleeve, and consequently also the stamp, are centered relative to the bottom die 2 by a hoop 15 surrounding the sleeve 11 and sliding around the bottom die 2.

The external toric surface whose circular cross-section has a radius r (FIG. 1) and whose line of centers has a radius R (FIG. 2), and the cylindrical ends thus formed with a transverse radius r have a very satisfactory geometry and surface state needing no finishing. On the other hand, the concave spherical surface must be reground after the thermochemical hardening treatment of the segment.

According to the invention the external toric surface serves as a positioning reference during this grinding operation.

FIGS. 4, 4a and 5 to 7 illustrate diagrammatically the principle of the holding of the segment accurately in position relative to the body 16—or workpiece carrier plate—of a mount 13, which in turn is intended to be accurately guided during the operation of grinding the concave spherical bearing surface 10.

Figures 6, 7:
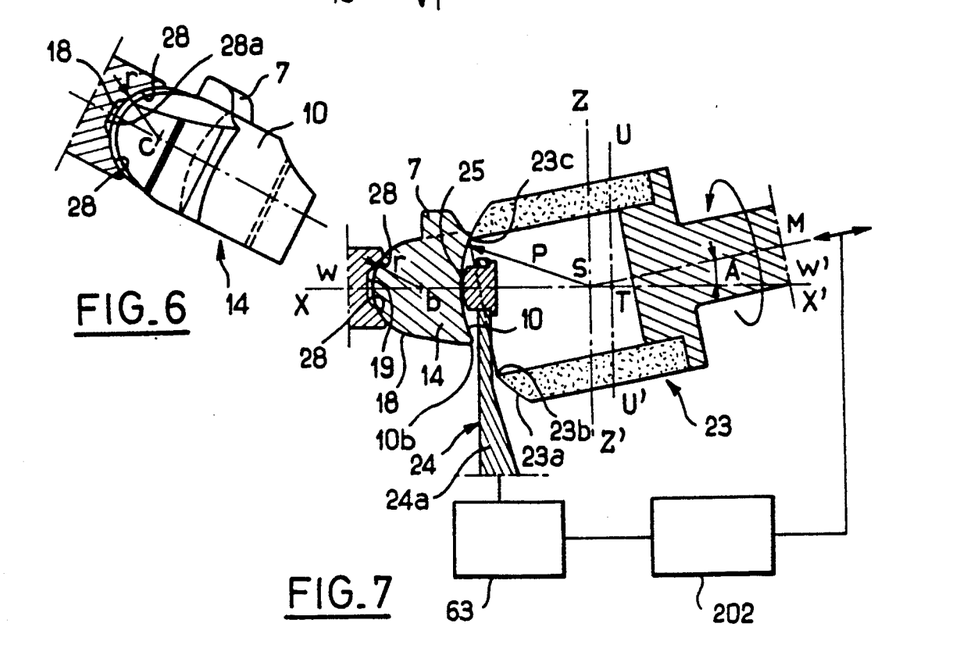
FIG. 6 is a view of the segment, with a fixed seat in section, taken at plane VI13 VI in FIG. 4.
FIG. 7 is a view in section taken at plane VII—VII in FIG. 4.

The plate 16 comprises two fixed bearing surfaces or seats 17, which are thus fixed relative to each other, and which have a circular profile with a radius r complementary to the cross-section of the rolling torus 18 of the segment 14 (FIG. 6). The seats 17 are spaced circumferentially apart about the axis UU' of the toric surface 18.

Figure 4:
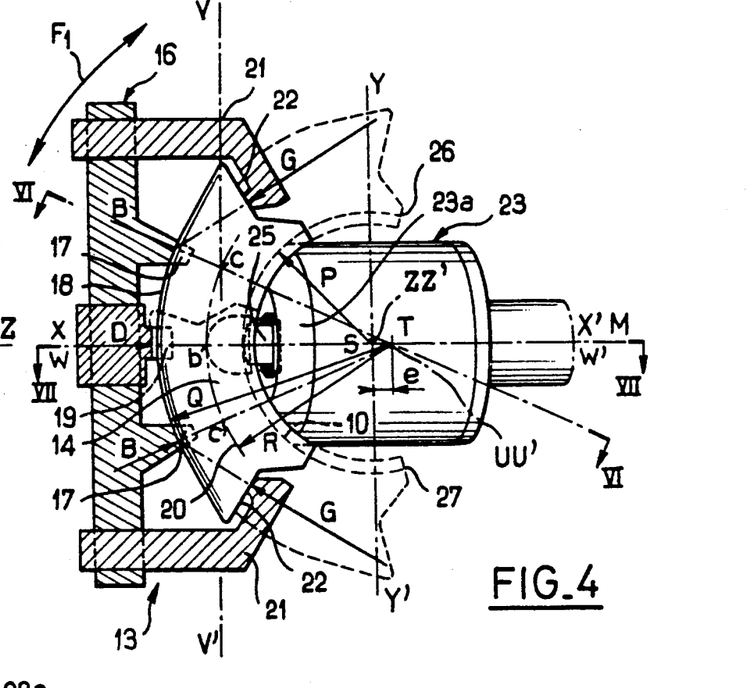
FIGS. 4 and 4a show schematically, viewed from below, the principle of holding and accurate positioning of a roller segment by a mount and a first mode of grinding a concave spherical bearing surface in two positions of the mount.

The segment 14 bears against the seats 17 in an intrinsically unstable manner in respect of rotation about a geometrial axis VV' substantially passing through the centers C of the profiles of the two positioning seats 17. It is for that reason that the mount is provided with a third seat 19, which is situated midway on the circumference between the two positioning seats 17, said third seat 19 being movable on the median axis WW' desired for the segment 14 and bearing, during operation, at the middle of the circumferential length of the external surface of the segment.

The designation "circumferential plane of the segment" will be given to the plane intersecting at right angles the axis UU' of the external toric surface 18 at the center T of the latter.

The designation "median axis WW' of the segment" will be given to the axis which is carried by the circumferential plane of the segment, intersects the axis UU', and passes through the segment at circumferential midlength of the latter. In the position shown in FIG. 4, the median axis coincides with a fixed axis XX' connected to the frame (not shown) of the grinding machine.

When the segment 14 is supported against the two seats 17 and against the third seat 19, the axis UU' of the toric surface 18 and its center T are accurately positioned relative to the plate 16.

It is desired that the spherical bearing surface 10 to be formed on the segment 14 should have a center S which is situated on the median axis, coinciding with the axis XX' in the drawings, and between the segment and the center T of the toric surface 18.

For the purpose of this machining the plate 16 is supported by the grinding machine frame (not shown) to be rotatable about an axis ZZ' intersecting, at right angles to the center S desired for the spherical bearing surface 10, the circumferential plane of the segment as defined by the seats 17, 19. The eccentricity e has been greatly exaggerated in FIG. 4 for the sake of clarity. In practice it is of the order of 1 to several tenths of a millimeter. This eccentricity conditions the characteristic of a return of the segment to the neutral position during the utilization of the joint. With this eccentricity the median region of the segment is in fact radially thinner than the remainder of the segment and, under load, the segment tends to become positioned about the trunnion in such a manner that its thinnest region is interposed between the trunnion and the rolling track. It is important that the eccentricity e between the centers S and T should have the desired orientation.

In order to achieve this, the transverse plane of symmetry of the segment, passing through the axis UU' of the toric surface 18 and through the median axis WW' of the segment, must contain the spherical center S desired for the spherical bearing surface 10, so that the very short segment ST representing the eccentricity "e" will be oriented parallel to the transverse plane of symmetry of the segment. If the center S were moved away, even if only by a few tenths of a millimeter, from the transverse plane of symmetry of the segment, the segment ST would form a very large angle, for example 15°, with the transverse plane of symmetry of the segment, because the length "e" of the segment ST, which is greatly exaggerated in the drawings for the sake of clarity, is itself of the order of 1 to several tenths of a millimeter. A roller segment with such an error in the orientation of ST would in operation be continuously brought back to a very bad position around its trunnion.

The condition that the transverse plane of symmetry (UU', WW') of the segment 14 should pass through the desired center S situated on the axis ZZ' is met mainly by means of the positioning seats 17. If a seat 17 were offset by one tenth of a millimeter relative to the axis ZZ', this would give rise to a great defect in the orientation of ST during the grinding of the segments. It should be noted in this respect that by positioning the segment 14 by supporting its toric surface 18 against the seats 17 the invention eliminates the risks of error due to an inaccurate position of the center T. The risk of inaccuracy in respect of the position of the center T is probable because the method by which the surface 18 is obtained consists of cold forming.

The condition that the plane (UU', WW') should pass through the center S is also met with the aid of two automatically controlled movable claws 21, which circumferentially wedge the segment 14 about the axis UU' of the toric surface 18. However, this wedging may be less accurate than the positioning effected by the seats 17, because an error in respect of the position of a claw 21 would result in an error of a much smaller order of magnitude in respect of the relative position of the centers S and T.

The two movable claws 21 come to bear against the ends 22 of the segment, applying thereto two forces G each directed, with a substantially tangential orientation, towards the center of the fixed seat 17 nearest to it, and the claws thus hold the segment locked against the three seats.

Each of the three seats 17 and 19 comprises two support surfaces 28 separated by a recess 28a extending parallel to the axis UU' of the toric surface 18 in order to achieve accurate positioning of the sections with a radius r.

The resultant of the forces G by which the claws 21 bear against the ends of the segment is parallel to the median axis of the segment and must be greater than the support force D of the movable seat 19, in order that the forces B of the fixed seats 17 may retain an effective guiding capacity. However, the forces G and D may be great in comparison with the forces B in order to machine the spherical bearing surface 10 while the segment is deformed substantially as it will be in operation under nominal load, as has been stated above.

The eccentricity e has been greatly exaggerated in FIG. 4 for the sake of clarity. In practice it is of the order of 1 to several tenths of a millimeter. This eccentricity conditions the characteristic of a return of the segment to the neutral position during the utilization of the joint. With this eccentricity the median region of the segment is in fact radially thinner than the remainder of the segment and, under load, the segment tends to become positioned about the trunnion in such a manner that its thinnest region is interposed between the trunnion and the rolling track.

The grinding is effected with the aid of a cup type grinding wheel 23, whose axis of rotation MS passes strictly through the center S desired for the spherical bearing surface, and consequently intersects at S the pivoting axis ZZ' of the mount 13. The grinding wheel 23 is provided at its end with an annular operative surface 23a which is a spherical zone with a radius P equal to the radius desired for the spherical bearing surface 10 and is centered on the axis MS of the grinding wheel.

The infeed of the grinding wheel for the work of grinding the concave spherical bearing surface 10, for compensation of the wear of the grinding wheel, and also for the withdrawal movement to enable segments which are to be machined to be placed in position and to enable the machined segments to be removed, takes place along the axis MS.

Figure 4A:
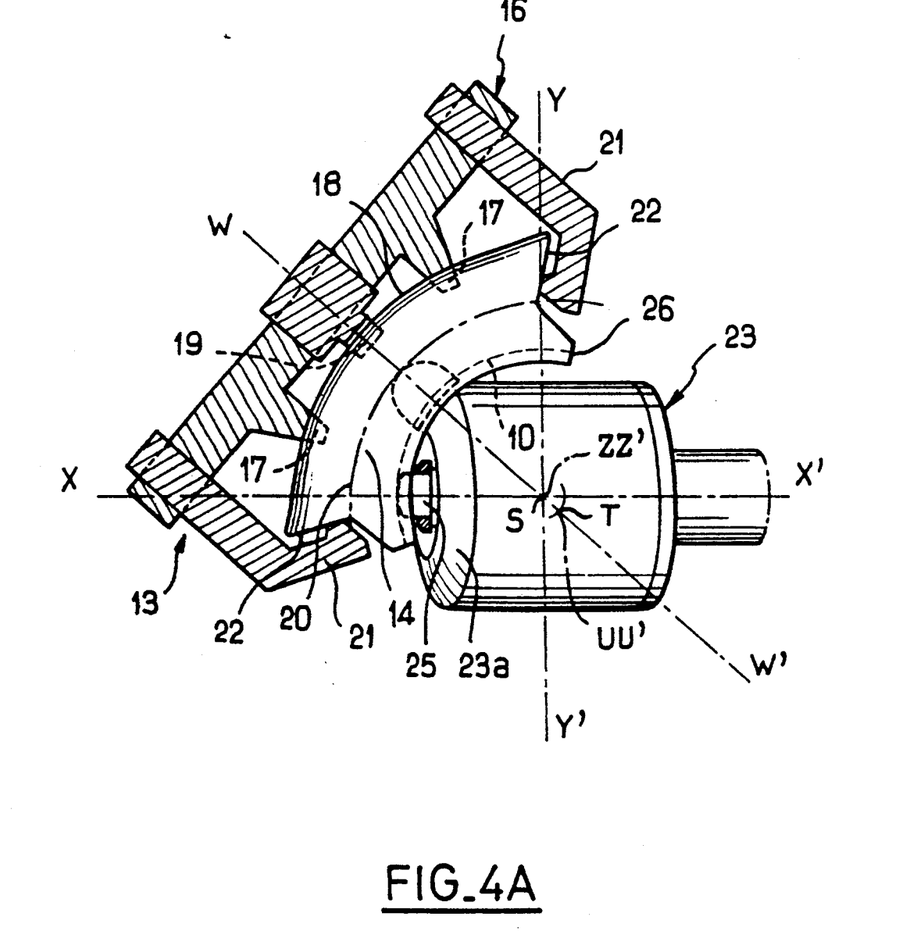
Figure 5:
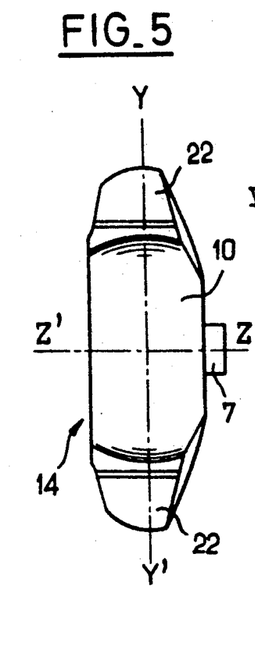
FIG. 5 is a view of the segment from the right in FIG. 4.

During the machining, the grinding wheel is infed along its axis at the same time as it is rotated about its axis. At any moment only a part of the spherical bearing surface 10 is in contact with the operative surface 23a of the grinding wheel. The machining of the entire bearing surface 10 results from a relative rotational sweeping movement between the grinding wheel on the one hand and the segment 14 and its mount 13 on the other hand. This rotational sweeping movement is obtained by the reciprocating pivoting of the mount and of the segment carried by the latter about the axis ZZ', as diagrammatically indicated by the arrow F1 in FIG. 4. This movement is permitted by the pivoting mounting on the axis ZZ', provided between the plate 16 and the frame (not shown) of the grinding machine. In FIG. 4 the segment 14 is shown halfway along the sweeping travel (axes XX' and WW' coinciding) and, in broken lines, in its two end positions 26 and 27. FIG. 4a shows the situation when the segment is in the position 26 in FIG. 4. The median axis WW' of the segment is then at a distance from the axis XX'.

The grinding device contains in addition a sensor 24 provided with a prod 25 of very hard material, such as tungsten carbide. The prod 25 is in contact with the bearing surface 10 during the machining, in a region of said surface which faces the bore 23d of the grinding wheel 23 and which consequently is not in contact with the operative surface 23a of the grinding wheel 23. The sensor 24 is supported by the frame of the machine and its prod 25 bears against the bearing surface 10 on the axis XX' in such a manner as always to be in contact with the bearing surface 10, whatever the position of the segment 14 in its reciprocating movement about the axis ZZ'.

The sensor 24 has an arm 24a which extends between a region 10b of one of the side edges of the bearing surface 10 and a region 23b of the inner annular edge of the operative surface 23a. The regions 10b and 23b are distant from one another. Because of an angle A (FIG. 7) between the axis XX' and the axis MS of the grinding wheel, the passage of the arm is facilitated while a region 23c, diametrically opposite the region 23b, of the inner annular edge of the surface 23a is in contact with the bearing surface 10.

The angle A between the axis of rotation MS of the grinding wheel and the axis XX' may vary from zero to some thirty degrees. It is conditioned not only by the presence of the arm 24a, but also by the need for the operative surface 23a of the grinding wheel to sweep as evenly as possible over the bearing surface 10 which is to be ground.

The sensor 24 is connected to a micrometric comparator 63, which is only diagrammatically indicated and which with the aid of an automatic control device 202, which is likewise only diagrammatically indicated, controls the movements of the grinding wheel along its axis, namely:

approach movement of the grinding wheel;
working infeed movement; and
halting of the working infeed movement, and movement for the withdrawal of the grinding wheel and of the sensor 24 when the precise dimension desired has been achieved.

More precisely, the sensor 24 permanently detects the position of the point of intersection between the axis XX' and the spherical bearing surface 10 in the course of the machining, and triggers the halting of the working infeed when this point is at a distance P, equal to the radius desired for the spherical bearing surface 10, from the center S desired for the spherical bearing surface 10. This situation is achieved when the center of the operative surface 23a of the grinding wheel is itself situated at the point S, as illustrated in FIG. 7.

In the description of a first practical example, illustrated in FIGS. 8 to 10, of a construction of a device for the purpose of applying the method described with reference to FIGS. 4 to 7, the same reference numerals as those used in FIGS. 4 to 7 will be utilized to designate functionally identical or similar elements, and only the differences in comparison with FIGS. 4 to 7 will be described.

The oscillating plate 16, which carries the fixed seats 17, is articulated on a frame 31 of the grinding machine by means of a hollow shaft 29 supported by a bearing 32 on axis ZZ', in order to permit the rotational sweeping movement about the axis. The movable seat 19 is machined in a lever 34, one end of which is articulated on the plate 16 about an axis 35, which is parallel to the axis ZZ', and is close to one end 22b of the segment 14 during operation.

The other end of the lever carries, rigidly fastened to it by means of two screws 36, a first detachable claw 21a for locking the segment against the seats. This claw 21a is said to be fixed because, as a result of the position of the axis 35, it provides a rigid circumferential support for the corresponding circumferential end 22a of the segment 14. The second claw 21b, carried by a lever 38, is controlled by a shaft 39 on the axis ZZ' fastened to the lever 38, the shaft 39 being mounted pivotally in the hollow shaft 29. The shaft 39 is connected to a means for applying to the claw 21b a moment in the direction of the circumferential compression of the segment against the claw 21a, thus at the same time supporting the external surface of the segment against the "movable"]seat 19, because of the orientation of the ends 22a and 22b relative to the forces exerted on them by the claws 21a and 21b. The support force G exerted by the controlled claw 21b is therefore sufficient to establish on the fixed seats 17 and are movable seat 19 the required support forces B and D which are proportional to G, the fixed claw 21a receiving a force substantially equal in magnitude to that applied by the controlled claw 21b. The value of the force G, which is adjustable at will by controlling the moment applied to the shaft 39, therefore conditions all the forces applied to the segment, the relative magnitude of which forces is determined once and for all by the position of the articulation axis 35.

Machining, and the very accurate positioning of the bearing surfaces 28 of the three seats 17 and 19 can be effected very simply, after dismantling the fixed claw 21a and immobilizing the lever 34 relative to the plate 16, by the operation of an internal grinding wheel whose profile corresponds to that desired for the seats 17 and 19, while the plate 16 is rotated about the axis ZZ'. It is true that the axis ZZ' is slightly eccentric relative to the axis UU' of the surface 18, but this eccentricity of the order of one tenth of a millimeter has no effect, because in operation the seat 19 will be movable relative to the seats 17 in the direction of the eccentricity.

Figure 12:
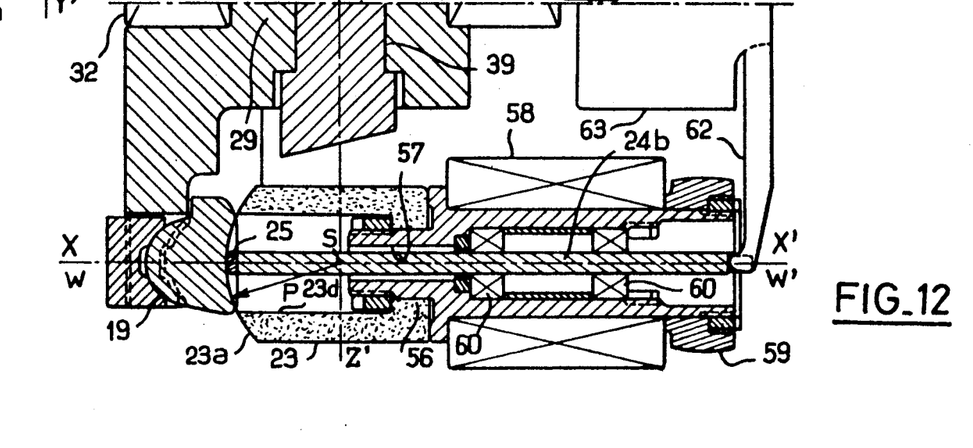
FIG. 12 is a view in section taken at plane XII—XII in FIG. 11.

A device (not shown) controlling the movements of the grinding wheel 23 along its axis MS can be triggered by a signal transmitted by a sensor (not shown) disposed as illustrated in FIG. 7 or 12 (the arrangement according to FIG. 12 will be described later on). The operative spherical surface 23a of the grinding wheel 23, as projected in the plane of FIG. 10, is included between the two circumferences 40a and 40b.

Figures 8, 9, 10:
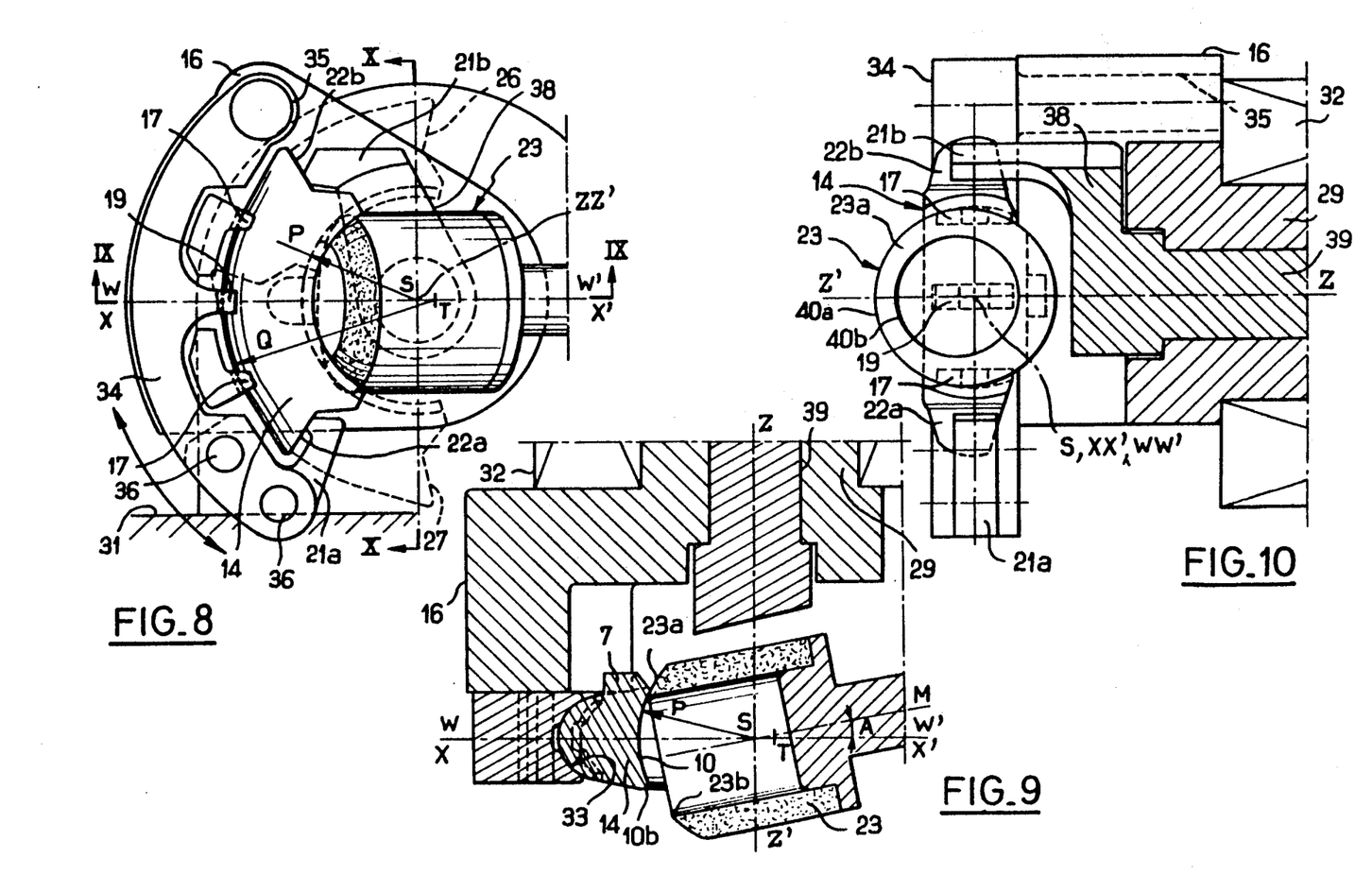
FIG. 8 is a similar view to FIG. 4, but shows a practical example of an application of the holding principle illustrated in FIG. 4.
FIG. 9 is a view in section taken at plane IX—IX in FIG. 8.
FIG. 10 is a view in section taken at plane X—X in FIG. 8.

In the arrangement shown in FIG. 9 the axis UU' of the toric surface 18 of the segment 14 is parallel to the axis ZZ' of the sweeping movement, but may be inclined, relative to that axis, about the axis WW' by an angle which may be as great as 90°. If this angle is 90°, an arrangement of the kind shown in FIG. 20, which will be described later on, is obtained. The position of the center S situated on the axis ZZ' and that of the center T of the torus are not changed. Only the device carrying the three seats and the two claws is inclined at the same angle as the axis of the torus.

Figure 11:
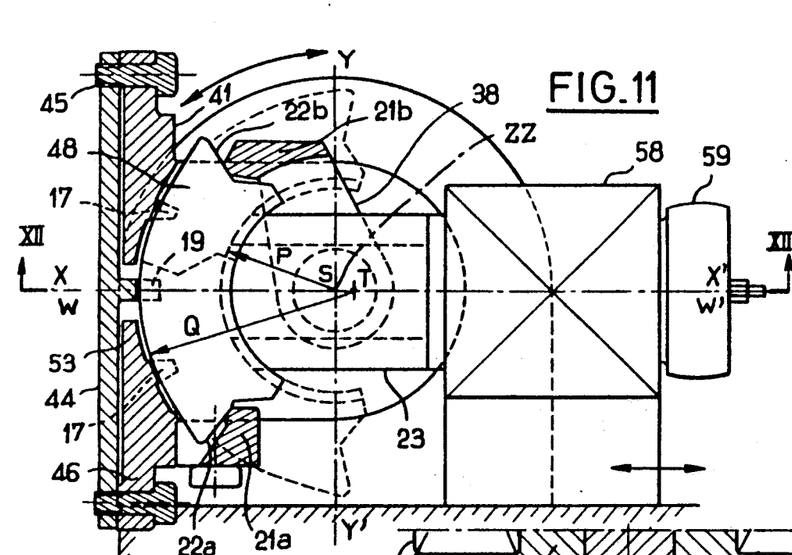
FIG. 11 is a similar view to FIG. 4, but relates to a second example of an application of the first mode of grinding.

The embodiment shown in FIGS. 11 to 13 will be described only with regard to its differences in comparison with the previous embodiment, the same reference numerals being used as far as possible in the figures.

A resilient strip 44 is fixed at each end by screws 45 to lugs 46 machined on the plate 16. Halfway between its ends the strip 44 carries the movable seat 19.

The fixed claw 21a, fixed rigidly but detachably to the plate 16, retains circumferentially the end 22a of the segment 14, which in turn is locked at its other end 22b by the movable claw 21b carried by the lever 38 controlled by the inner shaft 39 coaxial to the axis of oscillation ZZ' of the plate 16.

Figure 13:
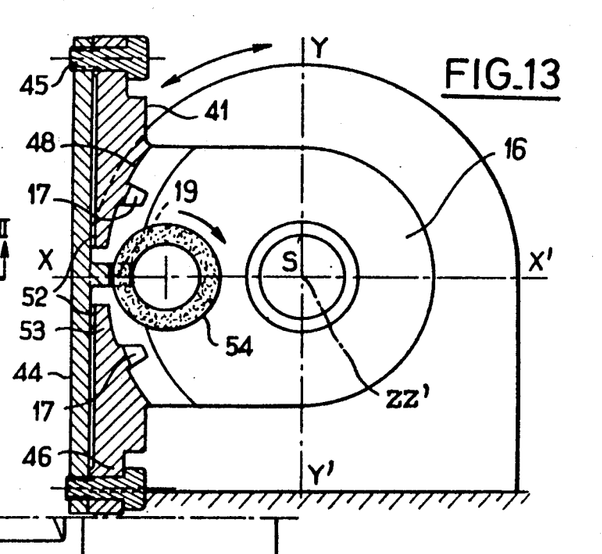
FIG. 13 is a similar view to FIG. 11, but shows fixed and movable seats in the course of machining.

The machining for very accurate positioning of the seats 17 and 19 is effected by grinding with the aid of an internal grinding wheel 54 having the precise profile required (FIG. 13). The plate 16 is rotated about its axis ZZ' after the fixed stop 21a has been dismantled. In addition, during the operation the flexible strip 44 is bent to an appropriate extent with the aid of wedges 52 interposed between the strip and projections 53 supporting the fixed seats. The value of the bending force thus applied will condition the support force of the movable seat 19 during the operations of grinding the segments, the position of which is always defined relative to the axis ZZ' by the fixed seats 17.

As shown in FIG. 12, in this example continuous monitoring of the grinding is achieved with the aid of an internal rod or sensor 24b concentric to the axis of rotation of the grinding wheel 23, which is here the axis XX' (in other words the angle A is equal to zero). The rod 24b extends in a bore 57 of the grinding wheel carrier shaft 56. This shaft, which turns inside a special high precision bearing 58 of known technique, is driven by a peripheral drive means, such as a pulley 59.

The sensor rod 24b is centered inside the grinding wheel carrier shaft 56 by bearings 60, inside which it is very freely slidable along the axis XX'. The sensor rod 24b, which carries the prod 25, controls a lever 62 of the micrometric comparator diagrammatically indicated by 63, the comparator supplying the automatic control signal for the position of the grinding wheel in the direction of its axis XX'.

The principle of operation would be similar if the inclination A between the axis of the grinding wheel and the axis XX' were not zero, for example as illustrated in FIG. 9.

The different phases of the operation are thus triggered: approach, grinding, halting of the infeed of the grinding wheel and the withdrawal of the latter, as well as the ejection of the machined segments, followed by the loading of the segments for machining.

Figures 14, 15, 16:
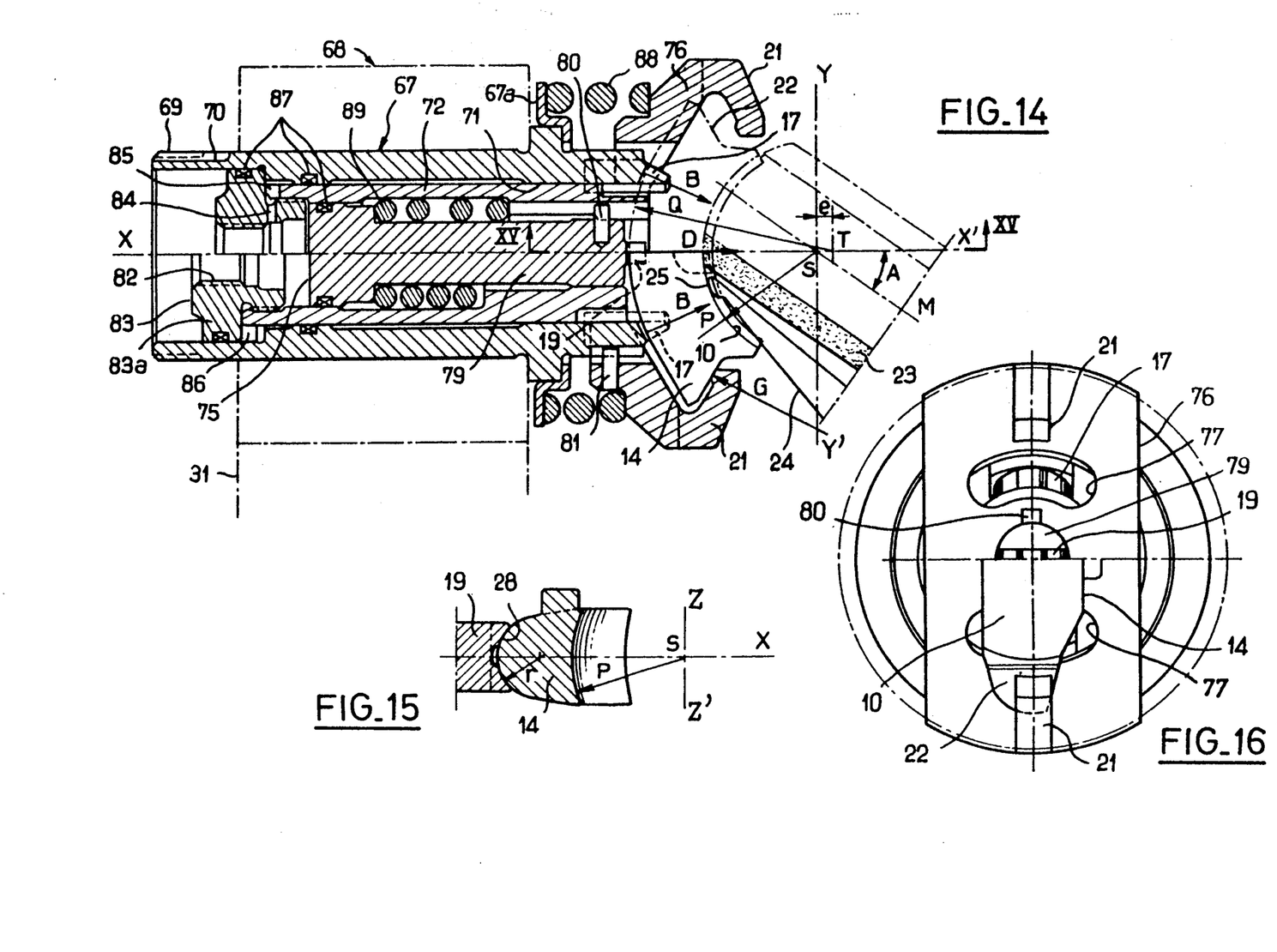
FIG. 14 shows in section an example of an application of a second mode of grinding according to the invention.
FIG. 15 is a partial view in section taken at plane XV—XV in FIG. 14.
FIG. 16 is a view of the mount taken from the right in FIG. 14, with the segment in position in the lower half of the view and absent in the upper half.

The example illustrated in FIGS. 14 to 16 will be describe only with respect to its differences from the preceding example. The reference numerals and letters of the preceding examples will as far as possible be retained for functionally identical or similar elements.

The example shown in FIGS. 14 to 16 relates to a second mode of grinding, in the sense that the rotational movement of the segment 14, which gives rise to a relative sweeping movement of the grinding wheel 23 over the spherical bearing surface 10, is here a continuous rotation about the axis XX'.

The two fixed seats 17 are machined at the end of a spindle shaft 67, which in a sense replaces the plate 16 of the previous examples and which is mounted in a bearing 68 on the axis XX', rotational relative to the frame 31 of the grinding machine. The spindle shaft 67 is driven rotationally by a pulley (not shown) fastened by a screwthread 69 and keying 70 to the end of the shaft remote from the segment 14 which is to be machined.

The shaft 67 has an axial bore 71 which receives a sleeve 72 carrying, at its end directed towards the segment 14, a plate 76 (FIG. 16) which in turn carries the two claws 21 developed radially to come to bear on the ends 22 of the segment 14 to be machined. The plate 76 is perforated at 77 (FIG. 16) to allow the passage of the two fixed seats 17 and permit the relative axial displacement of the claws 21 in relation to the seats. The movable central seat 19 is carried by the end of a piston 79 sliding inside the sleeve 72. A key 80 effects the relative angular fastening of the claw carrier sleeve 72 and the piston 79, and a key 81 effects the relative angular fastening of the sleeve 72 and the shaft 67. The sleeve 72, the piston 79 and the shaft 67 are therefore fastened together with respect to rotation about the axis XX'.

The claws 21 and also the movable central seat 19 are operated hydraulically or pneumatically. Pressure is supplied through a rotating connection fixed on a threaded inlet 82 machined in a stopper 83 screwed into the end of the sleeve 72 remote from the segment 14.

A collar 83a on the plug 83 is supported (through the screwing of the plug 83 into the sleeve 72) against the end of the sleeve and slides in a leaktight manner in a widened end region of the bore 71 in the hollow shaft 67.

A hole 84 passing through the plug 83 and a notch 85, formed in the sleeve edge bearing against the collar 83a, enable the pressure to act not only on the end of the piston 75, but also on the annular section 86 situated between the outside diameter of the collar 83a and the smaller outside diameter of the sleeve 72.

Three packings 87 ensure leaktightness under pressure, while permitting relative axial displacement, between the piston 79 and the sleeve 72, between the sleeve 72 and the bore of the hollow shaft 67, and between the collar 83a and the widened end region of the bore 71. The application of the pressure to the inlet 82 of the plug 83 thus gives rise to a force applied to the piston 79, and consequently to the movable seat 19, and directed towards the center S, and to a force exerted in the opposite direction on the sleeve 72 and consequently on the claws 21.

The magnitude of the pressure applied obviously conditions the intensity of the holding forces G, B and D. The whole arrangement holds the segment in a position in which its median axis is the axis XX'.

A compression spring 88 mounted around the shaft 67 and bearing axially against the shaft 67 (with the aid of a ring 67a) and against the rear face of the plate 76 returns the claws 21 and the sleeve 72 axially towards the center S.

A compression spring 89 mounted in the sleeve 72 around the piston 79 returns the piston 79, and consequently the movable seat 19, in the axial direction XX', that is to say in the direction moving the seat 19 away from the center S.

As shown at the top in FIG. 14, when there is no pressure, the springs 88 and 89 are relatively relaxed and bring the claws 21 and the movable seat 19 into a position freeing the segment 14 (shown in dot-dash lines).

On the other hand, as shown at the bottom in FIG. 14, the pressure applied at the inlet 82 generates forces capable of bringing the claws 21 and the seat 19 into a position clamping the segment against the action of the springs 88 and 89.

The working infeed takes place as in the previous examples through the infeeding of the grinding wheel 23 along its axis of rotation MS until the sensor 24 detects that the point on the spherical bearing surface 10 with which it is in contact is in a position corresponding to the coincidence between the real center of the spherical bearing surface 10 and the center S desired for the latter. In contrast to the preceding examples, the prod 25 is placed near the periphery of the grinding wheel 23, outside the latter. The point on the bearing surface 10 with which the prod 25 is in contact is sufficiently near the axis XX' for this contact to be permanent in the course of the rotation of the segment 14 about the axis XX'.

A sensor 24 supplies the position signal to the automatic control device controlling the movements of the grinding wheel in the direction MS, and operates the hydraulic or pneumatic solenoid valve as well as the system (not shown) feeding and ejecting the segments.

The example illustrated in FIGS. 17 and 18 will be described only with respect to the differences between it and the preceding example. The reference numerals and letters used in the preceding examples will, as far as possible, be used again for functionally identical or similar elements.

Figure 17:
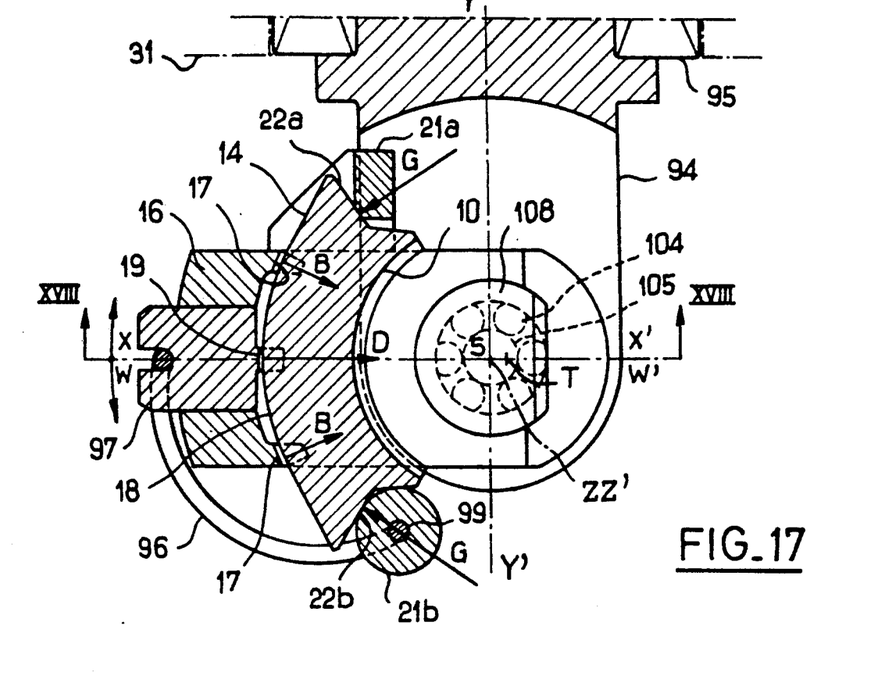
FIG. 17 is a view of a mount utilizable in the context of a third mode of grinding a concave spherical bearing surface, shown in section in the circumferential plane of the segment.
Figure 18:
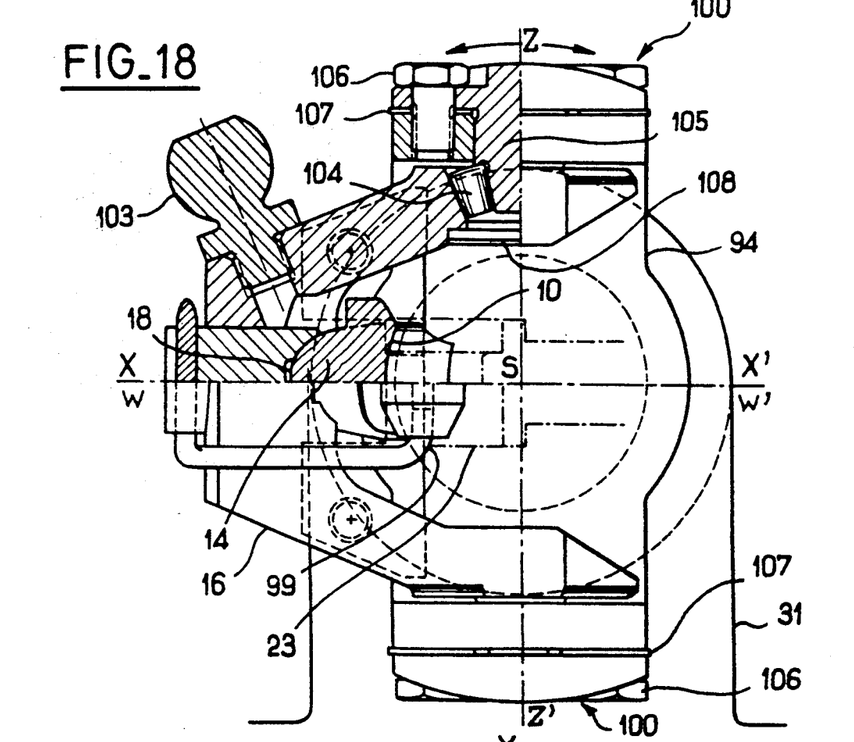
FIG. 18 is a view in elevation of the mount shown in FIG. 17, with a half-section taken at plane XVIII—XVIII in FIG. 17.

The example shown in FIGS. 17 and 18 relates to a third mode of grinding, in the sense that the relative sweeping movement made by the grinding wheel 23 over the spherical bearing surface 10 is here a spherical oscillatory movement about the center S, through the combination of two oscillatory rotational movements about two axes ZZ' and YY' at right angles to one another, intersecting at the center S desired for the spherical bearing surface 10. The axis YY' is at right angles to the axis XX'.

The segment 14 is positioned on the fixed seats 17, which are machined inside a cradle 16 pivoting by means of a universal joint in relation to the frame 31 of the machine.

To be more precise, the cradle 16 is pivoted about the axis ZZ' on a universal joint yoke 94 which itself oscillates about the axis YY' in a bearing 95 fastened to the frame 31.

The bearing 95 is a high precision bearing of a known type. It therefore defines with great precision the position of the axis YY' relative to the frame 31.

The oscillatory movement about the axis ZZ' is obtained with the aid of two coaxial joints 100 provided with conical rollers 104, in which the central cone 105 is fixed to the yoke 94 by screws 106, with adjustability along the axis ZZ' through the interposition of calibrated shims 107. It is thus possible to take up play in the joints 100 and at the same time to position the cradle 16 accurately along the axis ZZ', in such a manner that the circumferential plane of the segment, as defined by the seats 17, passes through the point of intersection S of the axes YY' and ZZ'. Leaktightness of the joints 100 is achieved by means of a closure plate 108 fixed to the cradle 16, facing the end of the cone 105, and by means of leaktight packings (not shown).

It is to be noted that with this mode of grinding, in contrast to the preceding modes, the axis ZZ' is not fixed relative to the frame, because it is fastened to the yoke 94 which pivots about the axis YY' relative to the frame.

The cradle 16 carries a joint ball 103 controlling the oscillatory movement about the axis ZZ'. The joint ball 103 is intended to be pivoted on a connecting rod to which a reciprocating movement is imparted by means of a crank. The movement about the axis YY' may be controlled, in a manner not illustrated, by action on the yoke 94 on the side of the bearing 95 remote from the cradle 16.

The segment 14 is locked against the fixed seats 17 with the aid of a resilient stirrup 96 pivoted on a plunger 97 mounted in the cradle 16 for sliding along the median axis WW' of the segment. The plunger 97 carries the movable central seat 19. The stirrup 96 has two curved ends 99, which are articulatedly engaged in the central bore of a roller constituting the claw 21b and consequently coming to bear against the end 22b of the segment 14. The resilient stirrup 96 therefore provides at one and the same time the force bearing against the end 22b and the support force of the central seat 19 on the segment 14. The other end 22a of the segment is supported against the claw 21a, which is detachably fastened to the cradle 16.

The segment 14 is mounted and locked on the seats 17 and 19 by the stirrup 96 when the device is motionless. The relative values of the holding forces B, D and G are determined by the positions of the articulation points of the stirrup 96 on the plunger 97 and on the roller 21b, and their intensity is determined by the extension stiffness of the stirrup 96.

The amplitudes of the two rotations, respectively about the axis YY' and about the axis ZZ', may advantageously be different and be adjusted for the best possible sweeping of the area of the concave spherical bearing surface 10. The frequencies of these oscillations are defined in accordance with the operation which is to be carried out.

This operation may be a grinding operation, as in the examples already described above, or else a superfinishing operation employing honing, this operation following the grinding operation. The present machining mode, with a sweeping movement about two axes at right angles to one another, is in fact particularly suitable for superfinishing by means of honing.

Superfinishing by means of honing is an operation the object of which is to reduce the roughness of the surface by levelling the microprofiles resulting from the preceding grinding, but without modifying the geometry, thus making continuous dimensional monitoring unnecessary for this operation.

For the superfinishing operation by means of honing the abrasive tool is brought close to the spherical bearing surface 10 which has been ground, along an axis passing through the center S. This may be the axis XX', which is the axis at right angles to the axis YY' and to the mid-position of the axis ZZ'. It may also be an axis such as the axis MS in the preceding examples, forming an angle A with the axis XX'. By this approach movement, the abrasive tool, which has a convex spherical working surface complementary to that of the segment 14, is applied flexibly against the concave spherical surface while the segment oscillates about the axes ZZ' and YY' at a higher frequency than in the grinding operation.

If on the contrary it is desired to carry out a grinding operation, it is possible, as illustrated in FIG. 18, to dispose the grinding wheel on the axis XX', to infeed it along that axis, and to rotate it about this axis, while continuous monitoring of the machining dimension can be effected with the aid of a sliding rod operating a comparator as illustrated in FIG. 12.

The profile of the fixed seats 17 is ground by oscillating the cradle 16 about its axis ZZ'.

Figure 19:
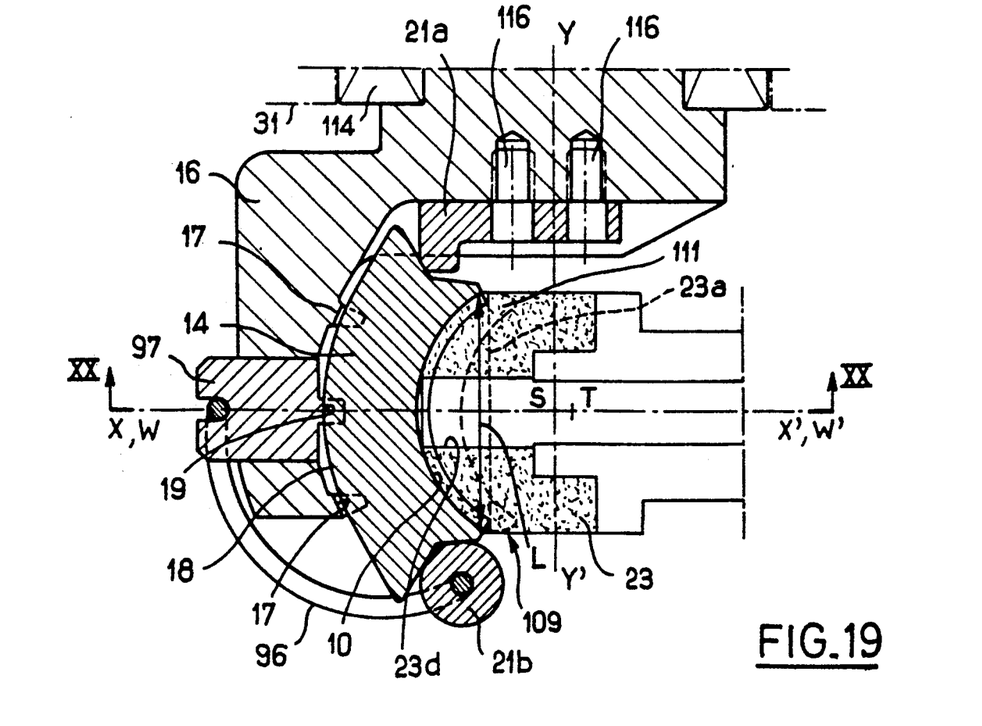
FIG. 19 is a view of a simplified variant of the third mode of grinding, in section in the circumferential plane of the segment.
Figure 20:
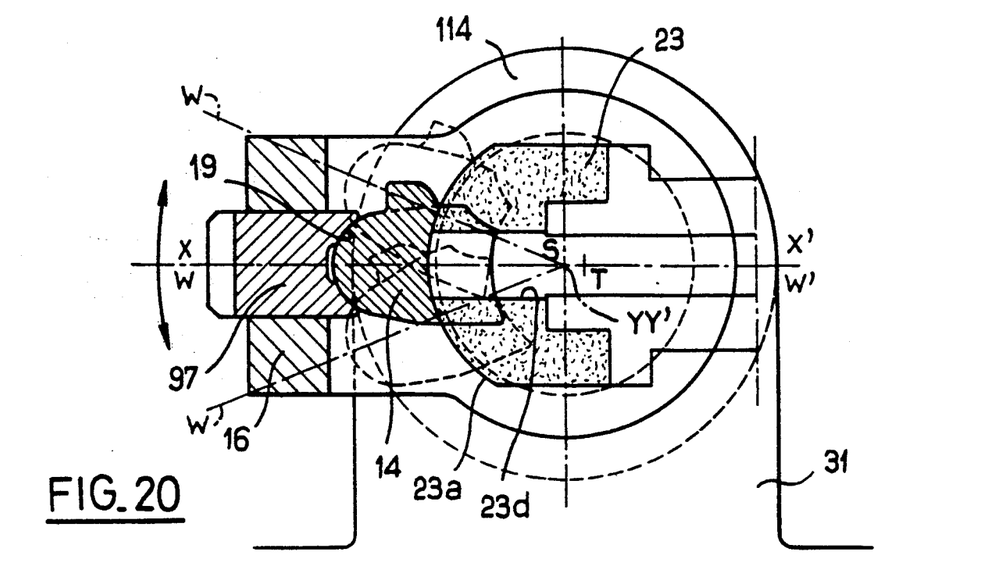
FIG. 20 is a view in section taken at plane XX—XX in FIG. 19.

The example illustrated in FIGS. 19 and 20 relates to a simplified variant of the third machining mode, in the sense that the rotational movement of the segment 14, by which the relative sweeping movement of the grinding wheel 23 over the spherical bearing surface 10 is brought about, is here a reciprocating rotation about the axis YY'. This example will be described only with respect to its differences from the previous example, the same reference numerals and letters being used as far as possible.

The body 16 carrying the fixed seats 17 is pivoted on the frame 31 with the aid of a bearing 114 having the axis YY'. The mounting of the movable seat 19 and of the movable claw 21b is identical to that shown in FIGS. 17 and 18. The fixed claw 21a is fixed to the body 16 by means of two screws 116.

As shown in FIG. 19, the grinding wheel 23 must have an outside diameter 109 larger than the opening L of the segment, in order that the entire area of the spherical bearing surface 10 may be swept over by the movement about the axis YY'.

However, in the positions of maximum oscillation the bearing surface of the segment 10 must extend beyond the spherical cutting rim 23a of the grinding wheel 23, as shown at 111 in FIG. 19.

Finally, the diameter of the bore 23d of the grinding wheel must be sufficiently small to ensure that in the vicinity of the circumferential mid-length of the bearing surface 10 there will be a wide overlap between the zones machined in each end oscillation position.

Continuous micrometric monitoring can be effected by means of a sensor, a transmission rod of which passes inside the grinding wheel 23, as illustrated in FIG. 12. The axis of the grinding wheel is the axis XX', which is situated in the circumferential plane of the segment when the latter is at mid-position in its movement of oscillation about the axis YY'.

The methods and devices proposed according to the present application make it possible to effect economically, in large-scale series production, the grinding of accurate concave spherical bearing surfaces with strict positioning of the spherical center S relative to the center T of the external cylindrotoric surface previously cold formed and subjected to heat treatment. The eccentricity e required between the two centers T and S is in practice only a few tenths of a millimeter, so that the slightest error in the positioning of the spherical center relative to the torus would run counter to the desired aim, which is the return of the segment to the median position during the operation of the joint. Thanks to the system comprising the two fixed seats and the movable seat, the device proposed now makes it possible to achieve the indispensable accurate positioning of the center S reliably and automatically, despite the use of a toric reference surface cold formed and heat treated, and consequently having inevitable geometrical distortions. In addition, the maximum radial thickness dimension of the segment between the fixed seats and the spherical surface ground by the grinding wheel conditions the maximum radial dimension of the two segments mounted on a trunnion and assembled between rolling tracks of the sliding joint. The method and the device according to the invention fully ensure the obtaining of this radial dimension, thus achieving the assembly of the joint with minimum play, without the risk of seizure through mechanical interference. Finally, the generation grinding utilized durably ensures the obtaining of perfect sphericity of the concave spherical bearing surfaces. The cutting surface of the grinding wheel profiles itself during the work.

The grinding marks which can be seen on the concave spherical bearing surface when finished are curvilinear and inclined on the median plane of the torus, intercrossing at places. They are not of revolution, as is the case with conventional internal grinding. This characteristic is favourable for the reduction of the roughness of the concave spherical bearing surface and for the establishment of the micrometric hydrodynamic film of lubricant during the practical utilization of the joint.

The invention is obviously not limited to the examples described and illustrated.

In particular, different examples have been illustrated, each of which is characterized by a particular mode of fastening of the segment and a particular mode of machining. It is possible to combine in different ways the particular modes of fastening of the segment and the particular modes of machining.

With regard to the relative sweeping movement about two axes (example shown in FIGS. 17 and 18), it is possible to envisage other practical structures ensuring accurate positioning of the axes and ability to take up play. The oscillatory movements about the two axes can be controlled by electromagnetic oscillation generators.

The methods and devices for holding the segments in position can be utilized, for example, for the purpose of machining a cylindrical internal pivoting bearing surface for homokinetic joints of a different type from those described at the outset, or else for machining a spherical bearing surface whose center would coincide with that of the external rolling surface.

I claim:

1. A method of holding a roller segment having a toric external surface with a rounded transverse profile in position for machining a concave pivoting bearing surface on said roller segment, comprising:
   providing two positioning seats fixed relative to each other for supporting said toric external rolling surface, each said positioning seat having a profile with a profile center;
   placing said toric external rolling surface against said two positioning seats, wherein said two positioning seats are circumferentially spaced apart relative to said toric external rolling surface;
   immobilizing said roller segment such that said roller segment is prevented from rotating about an axis extending through both said profile centers of said two positioning seats; and
   applying a compressive force to each end of said roller segment, wherein said toric external rolling surface has a central axis and said compressive forces are directed substantially perpendicularly to a radial line extending from said central axis.

2. The method according to claim 1, wherein said step of immobilizing said roller segment with respect to rotation about said axis extending through said profile centers comprises providing a third seat movable relative to said two positioning seats in a radial direction with respect to said toric external rolling surface and said central axis thereof and applying said third seat to said toric external rolling surface.

3. The method of claim 2, wherein said third seat is applied substantially midway between two positioning seats.

4. A method of holding a roller segment having a toric external surface with a rounded transverse profile in position for machining a concave pivoting bearing surface on said roller segment, comprising:
   providing two positioning seats fixed relative to each other for supporting said toric external rolling surface, each said positioning seat having a profile with a profile center;
   placing said toric external rolling surface against said two positioning seats, wherein said two positioning seats are circumferentially spaced apart relative to said toric external rolling surface;
   applying a compressive force to each end of said roller segment, wherein said toric external rolling surface has a central axis and said compressive forces are directed substantially perpendicularly to a radial line extending from said central axis; and
   applying a radially directed force against and toward the interior of said toric surface external rolling surface substantially midway along the circumferential extent of said roller segment.

5. The method according to any one of claims 1-4, wherein each said compressive force is directed toward the closest of said two positioning seats along the circumference of said toric external rolling surface with respect to the point of application of said compressive force.

6. The method according to any one of claims 1-4, and further comprising angularly positioning said roller segment on said two positioning seats about said central axis of said toric external rolling surface.

7. The method according to claim 6, wherein said step of angularly positioning said roller segment on said two positioning seats and said step of applying a compressive force to each end of said roller segment comprises providing a first claw circumferentially fixably mounted with respect to said two positioning seats and a second claw circumferentially movably mounted and supporting one end of said roller segment with said first claw and supporting and applying force to the other end of said roller segment with said second claw.

8. The method according to claim 6, wherein said step of angularly positioning said roller segment on said two positioning seats and said step of applying a compressive force to each end of said roller segment comprises providing two claws movably mounted with respect to said two positioning seats movable in a direction substantially parallel to a radius of said toric external rolling surface midway along said roller segment and applying said claws to said ends of said roller segment, respectively.

* * * * *